(12) United States Patent
An et al.

(10) Patent No.: US 8,854,436 B2
(45) Date of Patent: Oct. 7, 2014

(54) STEREOSCOPIC IMAGE DISPLAY AND METHOD FOR DRIVING THE SAME

(75) Inventors: Cheunghwan An, Seoul (KR); Jaewoo Lee, Gyeongbuk (KR); Hyejin Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 496 days.

(21) Appl. No.: 13/325,272

(22) Filed: Dec. 14, 2011

(65) Prior Publication Data

US 2012/0154556 A1   Jun. 21, 2012

(30) Foreign Application Priority Data

Dec. 20, 2010 (KR) .................. 10-2010-0130547

(51) Int. Cl.
*H04N 13/04* (2006.01)
*G02B 27/22* (2006.01)
*G02F 1/29* (2006.01)

(52) U.S. Cl.
CPC ...... *G02B 27/2214* (2013.01); *G02F 2001/294* (2013.01)
USPC .............................. 348/51; 349/15

(58) Field of Classification Search
USPC .......................... 348/51; 349/15, 33, 65, 200
See application file for complete search history.

(56) References Cited

U.S. PATENT DOCUMENTS

| | | | | |
|---|---|---|---|---|
| 7,978,151 | B2 * | 7/2011 | Taira et al. | 345/6 |
| 8,432,512 | B2 * | 4/2013 | Kim et al. | 349/65 |
| 2010/0053539 | A1 * | 3/2010 | Lin | 349/200 |
| 2011/0157499 | A1 * | 6/2011 | Lee et al. | 349/15 |

* cited by examiner

*Primary Examiner* — Hung Dang
*Assistant Examiner* — Mishawn Dunn
(74) *Attorney, Agent, or Firm* — Morgan, Lewis & Bockius LLP

(57) ABSTRACT

A stereoscopic image display includes a display panel, which displays first to nth view images produced by separating cameras from one another by a general distance between both eyes and photographing images of an object, where n is a natural number, a liquid crystal (LC) lens cell, which moves LC molecules existing in an LC layer between a lower substrate and an upper substrate of the display panel based on a voltage difference between a common electrode and each of electrodes to form an LC lens, an LC lens cell controller controlling a voltage supplied to each of the common electrode and the electrodes, and an LC lens cell driver supplying the voltage to each of the common electrode and the electrodes.

16 Claims, 11 Drawing Sheets

STEREOSCOPIC IMAGE DISPLAY AND METHOD FOR DRIVING THE SAME

This application claims the benefit of Korea Patent Application No. 10-2010-0130547 filed on Dec. 20, 2010, the entire contents of which is incorporated herein by reference for all purposes as if fully set forth herein.

BACKGROUND OF THE INVENTION

1. Field of the Invention

Embodiments of the invention relate to a stereoscopic image display and a method for driving the same.

2. Discussion of the Related Art

A stereoscopic image display implements a three-dimensional (3D) image using a stereoscopic technique or an autostereoscopic technique. The stereoscopic technique, which uses a parallax image between left and right eyes of a user with a high stereoscopic effect, includes a glasses type method and a non-glasses type method, both of which have been put on the market. In the glasses type method, a stereoscopic image is implemented on a direct-view display or a projector using polarized glasses by varying a polarization direction of the parallax image between the left and right eyes. Alternatively, the stereoscopic image is implemented on the direct-view display or the projector using liquid crystal (LC) shutter glasses by displaying the parallax image between the left and right eyes in a time-division manner. In the non-glasses type method, an optical axis of the parallax image between the left and right eyes is generally separated using an optical plate such as a parallax barrier and a lenticular lens, and thus the stereoscopic image is implemented.

A lenticular lens type stereoscopic image display includes a lenticular lens positioned between a display panel and the user. The lenticular lens separates the left eye image and the right eye image to thereby implement the stereoscopic image. However, the lenticular lens type stereoscopic image display is at a disadvantage in being unable to turn on or off light separation. Thus, an LC lens type stereoscopic image display has been proposed to turn on or off the light separation in a 2D mode and a 3D mode by applying an electric field to liquid crystals.

FIG. 1 illustrates a portion of a 3-view LC lens type stereoscopic image display. As shown in FIG. 1, the LC lens type stereoscopic image display sets an optimum viewing distance based on the size of the stereoscopic image display and sets a focal length of a LC lens L based on a general distance (for example, about 65 mm) between both eyes, thereby implementing a stereoscopic image. In particular, views of the stereoscopic image are produced by separating cameras from one another by the general distance between both eyes and photographing images of an object. When the object is photographed using three cameras, the LC lens type stereoscopic image display shown in FIG. 1 may provide the stereoscopic image of three views. The LC lens type stereoscopic image display transmits light from a display panel through LC lens cells, thereby implementing the three view images having first to third viewpoints.

When both eyes of the user are positioned inside the first to third viewpoints, he or she may watch the optimum stereoscopic image. When both eyes of the user are positioned inside the first to third viewpoints, he/she is positioned inside an orthoscopic viewing region. The orthoscopic viewing region indicates that his/her right eye is positioned at the first viewpoint and his/her left eye is positioned at the second viewpoint, or that his/her right eye is positioned at the second viewpoint and his/her left eye is positioned at the third viewpoint. On the other hand, when his/her right eye is positioned at the third viewpoint and his/her left eye is positioned at the first viewpoint, he/she watches a left eye image through his/her right eye and watches a right eye image through his/her left eye. Thus, he/she watches not an orthoscopic image but a pseudoscopic image and may feel inconvenience in watching the pseudoscopic image. Further, when he/she watches the view images from different LC lenses L through both eyes, he/she may perceive that the view images are mixed.

When both eyes of the user are positioned at the optimum viewing distance, the user may watch an optimum stereoscopic image. However, when both eyes of the user are positioned out of the optimum distance and are positioned close to the LC lens cell or far away from the LC lens cell, the user is positioned in a pseudoscopic image viewing region or a mixed viewing region of the view images. Thus, the user may feel inconvenience in watching the stereoscopic image.

SUMMARY OF THE INVENTION

The present invention relates to a stereoscopic image display. One object of the present invention is to stereoscopic image display which can provide the stereoscopic image with the optimum quality because the user can watch the stereoscopic image in the orthoscopic viewing region.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect, there is a stereoscopic image display comprising a display panel configured to display first to nth view images produced by separating cameras from one another by a general distance between both eyes and photographing images of an object, where n is a natural number, a liquid crystal (LC) lens cell configured to move LC molecules existing in an LC layer between a lower substrate and an upper substrate of the display panel based on a voltage difference between a common electrode and each of electrodes, form an LC lens, and refract the first to nth view images into first to nth viewpoints, an LC lens cell controller configured to control a voltage supplied to each of the common electrode and the electrodes, and an LC lens cell driver configured to supply the voltage to each of the common electrode and the electrodes under the control of the LC lens cell controller, wherein the LC lens cell controller receives a user viewing distance information and a user position information, calculates a focal length of the LC lens using the user viewing distance information and the user position information, calculates a shift information of the LC lens using the user position information, and control the voltage supplied to each of the electrodes based on an information of the calculated focal length and the calculated shift information.

In another aspect, there is a stereoscopic image display comprising a display panel configured to display first to nth view images produced by separating cameras from one another by a general distance between both eyes and photographing images of an object, where n is a natural number, a liquid crystal (LC) lens cell configured to move LC molecules existing in an LC layer between a lower substrate and an upper substrate of the display panel based on a voltage difference between a common electrode and each of electrodes, form an LC lens, and refract the first to nth view images into first to nth viewpoints, an LC lens cell controller configured to control a voltage supplied to each of the common electrode and the electrodes, and an LC lens cell driver configured to supply the voltage to each of the common electrode and the electrodes under the control of the LC lens cell controller, wherein the LC lens cell controller receives a user viewing distance information and a user position information, calculates a focal length of the LC lens using the user viewing distance information and the user position information, calculates a shift information of the LC lens using the user position information, and control the voltage supplied to each of the electrodes based on an information of the calculated focal length and the calculated shift information.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
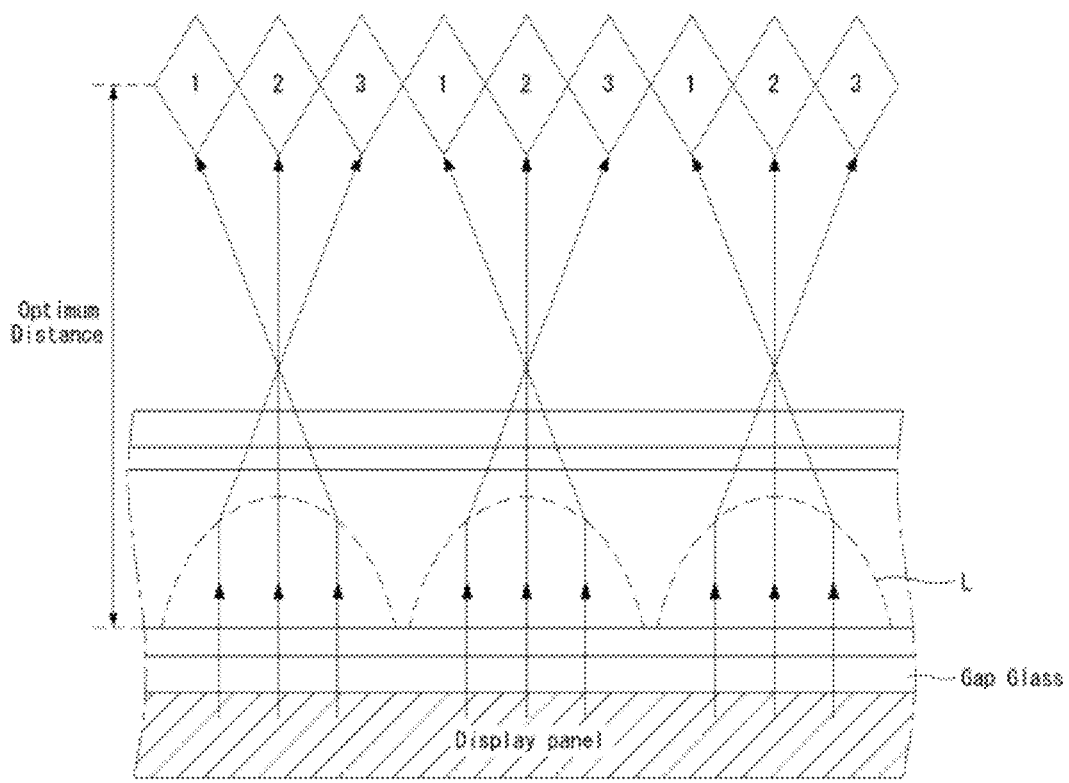
FIG. 1 illustrates a portion of a 3-view liquid crystal (LC) lens type stereoscopic image display.
Figure 2:
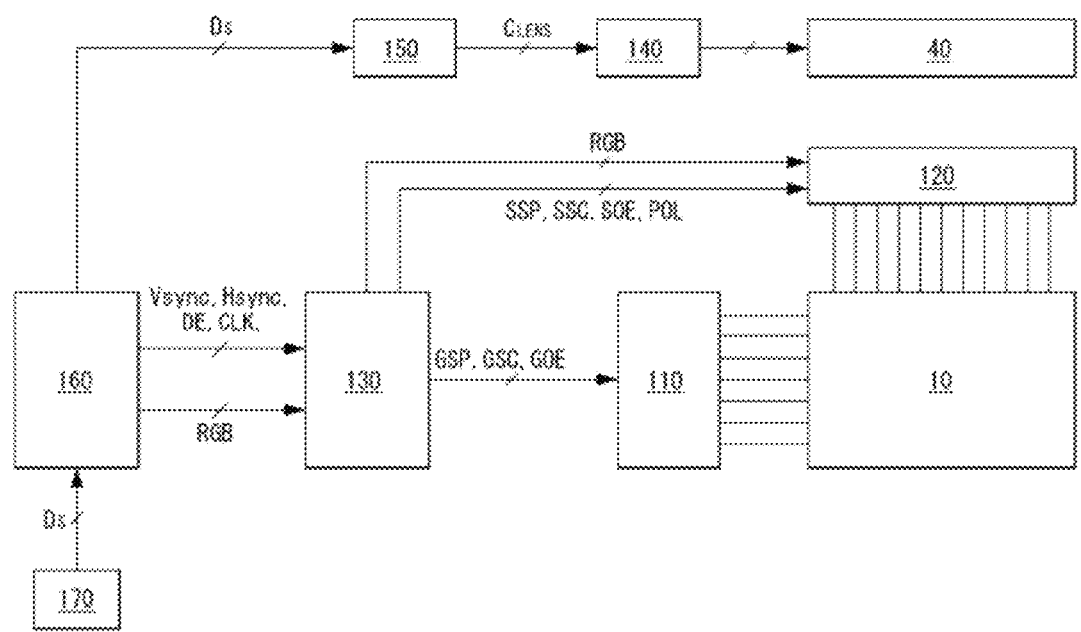
FIG. 2 is a block diagram of an LC lens type stereoscopic image display according to an exemplary embodiment of the invention.
Figure 3A:
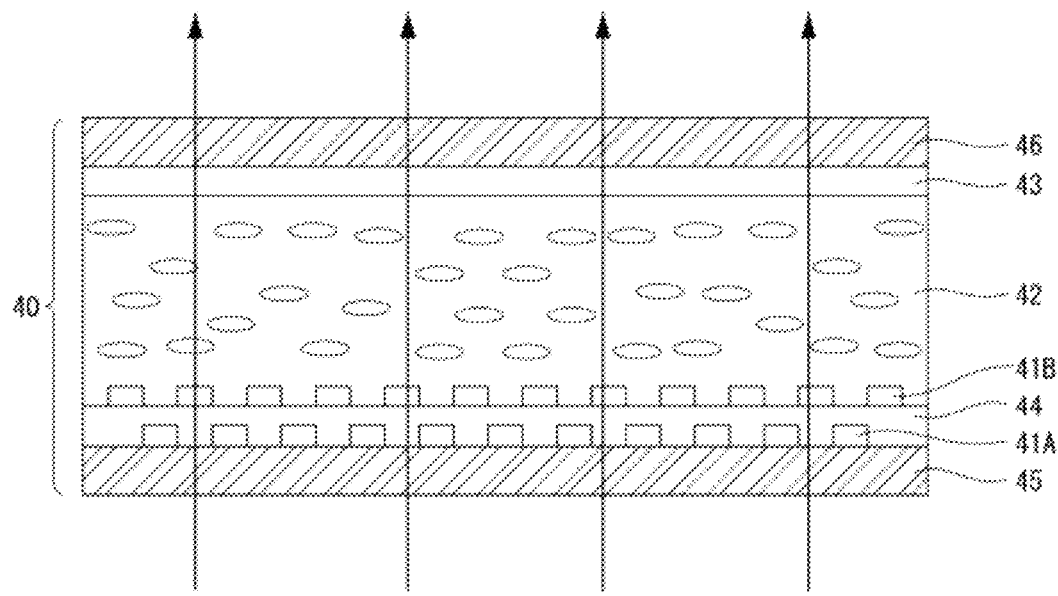
FIGS. 3A and 3B illustrate a portion of an LC lens cell in 2D and 3D modes.
Figure 3B:
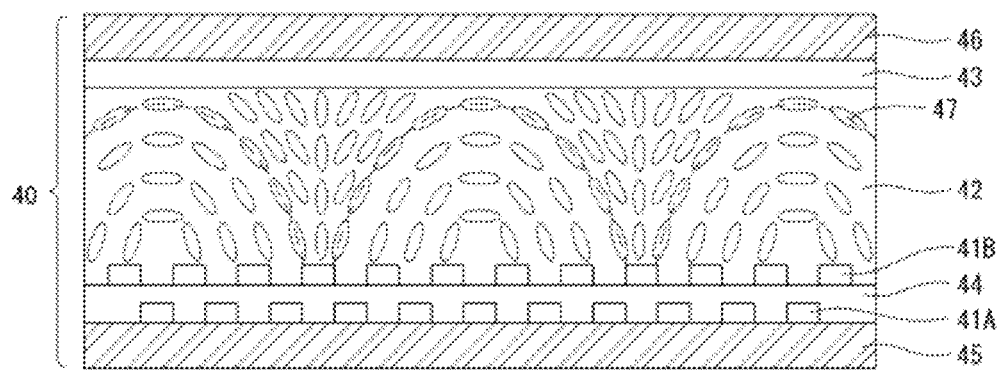

FIG. 2 is a block diagram schematically illustrating a liquid crystal (LC) lens type stereoscopic image display according to an exemplary embodiment of the invention. FIGS. 3A and 3B illustrate a portion of an LC lens cell in 2D and 3D modes.

As shown in FIG. 2, a stereoscopic image display according to an exemplary embodiment of the invention includes a display panel 10, an LC lens cell 40, a gate driver 110, a data driver 120, an LC lens cell driver 140, an LC lens cell controller 150, a timing controller 130, a host system 160, etc. The display panel 10 may be implemented as a display panel of a flat panel display such as a liquid crystal display (LCD), a field emission display (FED), a plasma display panel (PDP) display, and an organic light emitting diode (OLED) display. In the following description, the embodiment of the invention describes the LCD panel as an example of the display panel 10. Other kinds of flat panel display panels may be used. The LCD panel may use a display panel of a backlit LCD modulating light from a backlight unit.

The backlit LCD panel includes a lower substrate corresponding to a thin film transistor (TFT) substrate and an upper substrate corresponding to a color filter substrate. An LC layer is formed between the TFT substrate and the color filter substrate. Data lines and gate lines (or scan lines) crossing the data lines are formed on the TFT substrate (i.e., the lower substrate), and a plurality of LC cells are arranged in a plurality of cell regions defined by the data lines and the gate lines in a matrix form. A TFT formed at each of crossings of the data lines and the gate lines transfers a data voltage supplied via the data line to a pixel electrode of the LC cell in response to a gate pulse (or a scan pulse) received through the gate line. For this, a gate electrode of the TFT is connected to the gate line, a source electrode of the TFT is connected to the data line, and a drain electrode of the TFT is connected to the pixel electrode of the LC cell and a storage capacitor. The storage capacitor holds the data voltage transferred to the pixel electrode for a predetermined time until a next data voltage enters. A common voltage is supplied to a common electrode opposite the pixel electrode.

The color filter substrate (i.e., the upper substrate) includes black matrixes and color filters. The common electrode is formed on the color filter substrate in a vertical electric field driving manner such as a twisted nematic (TN) mode and a vertical alignment (VA) mode. The common electrode is formed on the TFT substrate along with the pixel electrode in a horizontal electric field driving manner such as an in-plane switching (IPS) mode and a fringe field switching (FFS) mode.

Polarizing plates are respectively attached to the upper and lower substrates of the backlit LCD panel. Alignment layers for setting pre-tilt angles of liquid crystals are respectively formed on the upper and lower substrates of the backlit LCD panel. A spacer is formed between the upper and lower substrates of the backlit LCD panel so as to provide a cell gap of the LC layer. The backlit LCD panel may be implemented in any liquid crystal mode as well as the TN, VA, IPS, and FFS modes.

The display panel 10 displays a 2D image under the control of the timing controller 130 in a 2D mode. The display panel 10 displays first to kth view images under the control of the timing controller 130 in a 3D mode, where k is a natural number equal to or greater than 2. The views of a stereoscopic image are produced by separating cameras from one another by a general distance between both eyes and photographing images of an object. For example, when the object is photographed using nine cameras, the display panel 10 displays a stereoscopic image of first to ninth views. The display panel 10 displays images of the first to ninth views at intervals of a pitch of an LC lens implemented by the LC lens cell 40. The LC lens refracts the first to ninth view images displayed on the display panel 10 into first to ninth viewpoints, thereby implementing the stereoscopic image. The first to ninth viewpoints are substantial implementation regions of the stereoscopic image. When a user is positioned at the first to ninth viewpoints, the user can watch an optimum stereoscopic image. The embodiment of the invention describes the first to ninth views and the first to ninth viewpoints as an example, but is not limited thereto. The stereoscopic image display according to the embodiment of the invention may refract the first to kth view images into the first to kth viewpoints, thereby implementing the stereoscopic image.

The data driver 120 includes a plurality of source driver integrated circuits (ICs). The source driver ICs convert 2D/3D image data received from the timing controller 130 into positive and negative gamma compensation voltages and generate positive and negative analog data voltages. The source driver ICs then supply the positive and negative analog data voltages to the data lines of the display panel 10.

The gate driver 110 includes a plurality of gate driver ICs. Each of the gate driver ICs includes a shift register, a level shifter for converting an output signal of the shift register into a signal having a swing width suitable for a TFT drive of the LC cell, an output buffer, and the like. The gate driver 110 sequentially supplies a gate pulse synchronized with the data voltage to the gate lines of the display panel 10 under the control of the timing controller 130.

The LCD requires a backlight unit. The backlight unit includes a plurality of light sources, which are turned on based on a driving current supplied by a backlight unit driver, a light guide plate (or a diffusion plate), a plurality of optical sheets, and the like. The backlight unit may be implemented as one of an edge type backlight unit and a direct type backlight unit. The light sources of the backlight unit may include one or at least two of a hot cathode fluorescent lamp (HCFL), a cold cathode fluorescent lamp (CCFL), an external electrode fluorescent lamp (EEFL), and a light emitting diode (LED).

The backlight unit driver generates the driving current for turning on the light sources of the backlight unit. The backlight unit driver switches on or off the driving current supplied to the light sources under the control of a backlight controller.

The backlight controller transmits backlight control data, which includes an adjustment value of a duty ratio of a pulse width modulation (PWM) signal in response to a global or local dimming signal received from the host system 160 or the timing controller 130, to the backlight unit driver in a serial peripheral interface (SPI) data format. The backlight controller may be mounted inside the timing controller 130.

The LC lens cell 40 is disposed on the display panel 10. As shown in FIGS. 3A and 3B, the LC lens cell 40 includes first electrodes 41A, second electrodes 41B, a LC layer 42, a common electrode 43, an insulating layer 44, a first substrate 45, and a second substrate 46. The first substrate 45 and the second substrate 46 may be formed of glass or film, etc.

The first and second electrodes 41A and 41B are patterned on the first substrate 45. The first and second electrodes 41A and 41B have a two-layered structure with the insulating layer 44 interposed therebetween. The insulating layer 44 prevents the short circuit between the first and second electrodes 41A and 41B. The first electrodes 41A are positioned between every the two second electrodes 41B. The common electrode 43 having a single-layered structure is patterned on the second substrate 46.

The LC layer 42 is formed between the first substrate 45 and the second substrate 46. LC molecules of the LC layer 42 move by a voltage difference between the common electrode 43 and the first and second electrodes 41A and 41B. As shown in FIG. 3A, in the 2D mode, the LC molecules of the LC layer 42 pass through light incident from the display panel 10 by the voltage difference between the common electrode 43 and the first and second electrodes 41A and 41B. Thus, the user may watch the 2D image not having binocular disparity.

As shown in FIG. 3B, in the 3D mode, a voltage difference is generated between the common electrode 43 and the first and second electrodes 41A and 41B. The LC molecules of the LC layer 42 move by the voltage difference. It is important to determine the voltage difference applied to the LC molecules and a shift amount of the LC molecules for the display of the stereoscopic image using the LC lens cell 40. The LC lens cell 40 is made by determining an electrode width/interval of an LC lens 47 in consideration of the movement of the LC molecules and then calculating an optimally applied voltage of the LC molecules. Because the constant voltage is applied to the common electrode 43 of the LC lens cell 40, the voltages of the first and second electrodes 41A and 41B are different from depending on a central portion or an edge of the LC lens 47. As a result, the LC lens 47 formed by the LC molecules may be a convex lens shown in FIG. 3B depending on the voltage difference between the common electrode 43 and the first and second electrodes 41A and 41B. Further, the LC lens 47 being the convex lens shown in FIG. 3B refracts the first to ninth view images into the first to ninth viewpoints, respectively.

The LC lens cell driver 140 supplies the voltage to each of the common electrode 43 and the first and second electrodes 41A and 41B of the LC lens cell 40. The LC lens cell driver 140 differently supplies the voltage in the 2D mode and the 3D mode under the control of the LC lens cell controller 150. More specifically, in the 2D mode, as shown in FIG. 3A, the LC lens cell driver 140 supplies the voltage, so that the LC lens transits light incident from the display panel 10. In the 3D mode, as shown in FIG. 3B, the LC lens cell driver 140 supplies the voltage, so that the LC lens 47 is formed.

The LC lens cell driver 140 supplies a common voltage to the common electrode 43 and periodically inverts a polarity of the voltage supplied to each of the first and second electrodes 41A and 41B. This is to prevent direct current (DC) image sticking of the liquid crystals. When the liquid crystals perform the DC drive, charged particles of the LC molecules are accumulated on the alignment layers and the pre-tilt angle of the LC molecules may vary. In this instance, the LC lens cell driver 140 prevents the DC image sticking of the liquid crystals.

The LC lens cell controller 150 receives informations the user senses from the host system 160. The LC lens cell controller 150 extracts a user position information and a user viewing distance information from the user informations. The LC lens cell controller 150 calculates an adjustment amount of a focal length of the LC lens based on the user position information and the user viewing distance information. The LC lens cell controller 150 compares the user position information with previously stored data and decides whether or not the user is positioned in an orthoscopic viewing region. When the user is positioned in a pseudoscopic viewing region, the LC lens cell controller 150 calculates a shift amount of the LC lens. The LC lens cell controller 150 outputs LC lens cell control data $C_{LENS}$ including information about the voltage to be applied to each of the first and second electrodes 41A and 41B to the LC lens cell driver 140 based on the calculated adjustment amount of the focal length of the LC lens and the calculated shift amount of the LC lens. The LC lens cell controller 150 may be mounted inside the timing controller 130 or the host system 160. The LC lens cell controller 150 is described in detail below with reference to FIG. 4.

The timing controller 130 drives the display panel 10 at a predetermined frame frequency and may generate a gate driver control signal and a data driver control signal based on the predetermined frame frequency. The gate driver control signal includes a gate start pulse GSP, a gate shift clock GSC, a gate output enable GOE, and the like. The gate start pulse GSP controls a timing of a first gate pulse. The gate shift clock GSC shifts the gate start pulse GSP. The gate output enable GOE controls an output timing of the gate driver 110.

The data driver control signal includes a source start pulse SSP, a source sampling clock SSC, a polarity control signal POL, a source output enable SOE, and the like. The source start pulse SSP controls a data sampling start time point of the data driver 120. The source sampling clock SSC controls a sampling operation of the data driver 120 based on a rising or falling edge thereof. If digital video data to be input to the data driver 120 is transferred based on a mini low voltage differential signaling (LVDS) interface standard, the source start pulse SSP and the source sampling clock SSC may be omitted. The polarity control signal POL inverts a polarity of the data voltage output by the data driver 120 every L horizontal periods, where L is a natural number. The source output enable SOE controls an output timing of the data driver 120.

The host system 160 supplies the timing controller 130 with image data RGB, timing signals including a vertical sync signal Vsync, a horizontal sync signal Hsync, a data enable DE, and a dot clock CLK, and a mode signal through an interface such as an LVDS interface and a transition minimized differential signaling (TMDS) interface. In the 2D mode, the host system 160 supplies 2D image data to the timing controller 130. In the 3D mode, the host system 160 supplies 3D image data including the first to ninth view images to the timing controller 130.

The stereoscopic image display according to the embodiment of the invention may sense a position of the user using a user sensor 170. The user sensor 170 may sense a viewing distance of the user using an infrared sensor. The user sensor 170 may store images of the user watching the stereoscopic image display using cameras. The host system 160 outputs a user sensing information $D_S$ received from the user sensor 170 to the LC lens cell controller 150. The user sensor 170 may directly output the user sensing information $D_S$ to the LC lens cell controller 150.

Figure 4:
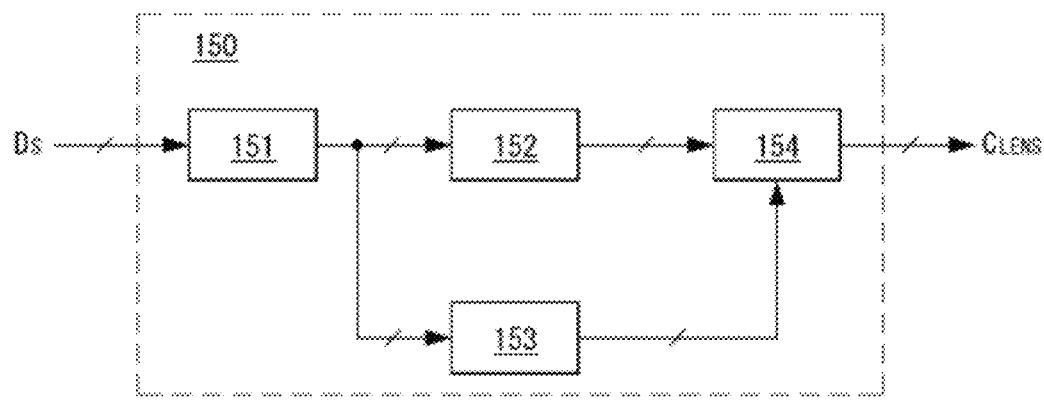
FIG. 4 is a block diagram of an LC lens cell controller according to an exemplary embodiment of the invention.

FIG. 4 is a block diagram of the LC lens cell controller 150 according to the embodiment of the invention. As shown in FIG. 4, the LC lens cell controller 150 includes a user information processing unit 151, a focal length calculating unit 152, an LC lens shift unit 153, and an electrode voltage controller 154.

Figure 5:
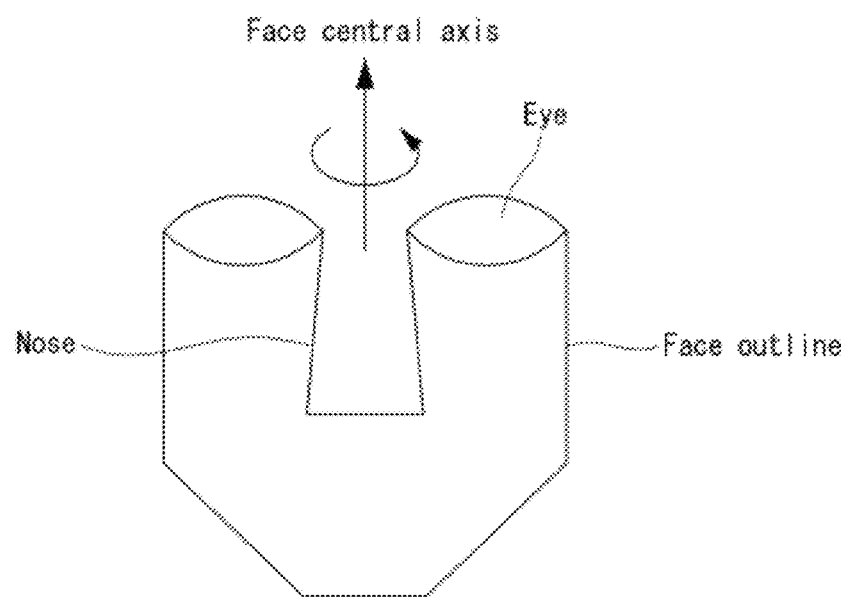
FIG. 5 illustrates an example of a facial mask.
Figure 6:
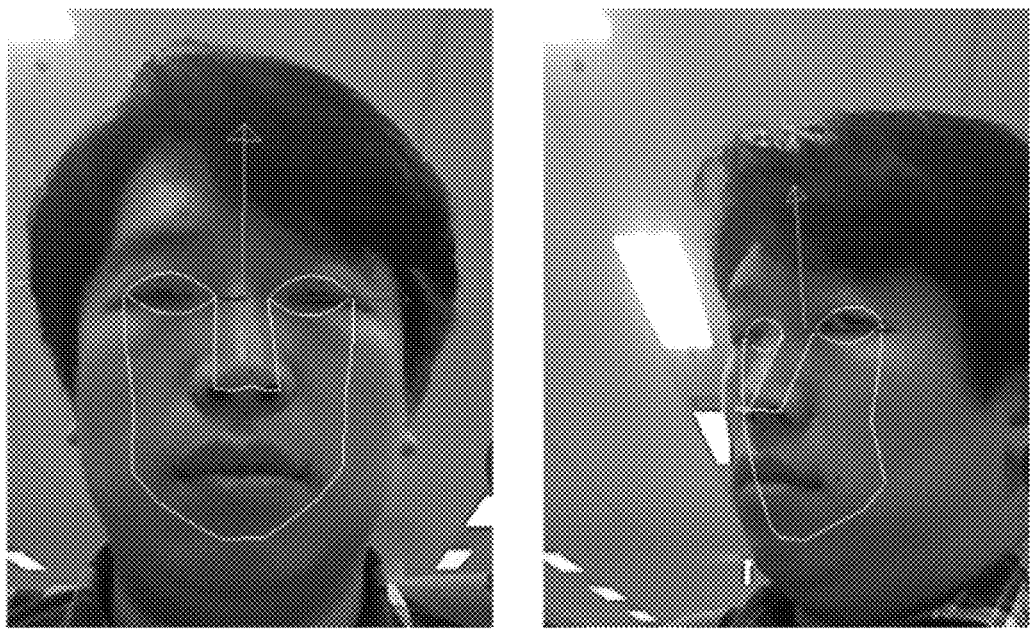
FIG. 6 illustrates a result obtained by mapping the facial mask shown in FIG. 5 to a user image.

The user information processing unit 151 receives the user sensing information $D_S$ sensed by the user sensor 170. The user sensing information DS includes the user viewing distance sensed through the infrared sensor, the user image stored using the camera, etc. As shown in FIGS. 5 and 6, the user information processing unit 151 may decide how far the user's face is from the stereoscopic image display through the user image using a facial mask method.

As shown in FIG. 5, the user information processing unit 151 defines outline characteristics of eyes, nose, and mouth based on a central axis of the face, thereby deciding the user's position using the facial mask. As shown in FIG. 6, the user information processing unit 151 maps the facial mask to the user image and recognizes the user's face, thereby deciding the user's position. The user information processing unit 151 outputs user position information, which is converted from the user's position and is expressed by coordinates, to the focal length calculating unit 152 and the LC lens shift unit 153. Further, the user information processing unit 151 outputs information about the user viewing distance sensed through the infrared sensor to the focal length calculating unit 152.

The focal length calculating unit 152 receives the user position information and the user viewing distance information from the user information processing unit 151. The focal length calculating unit 152 decides whether one user or a plurality of users watch the stereoscopic image based on the user position information. When one user watches the stereoscopic image, the focal length calculating unit 152 calculates a focal length of the LC lens based on a viewing distance of the one user. When the plurality of users watch the stereoscopic image, the focal length calculating unit 152 calculates a focal length of the LC lens corresponding to a position of each of the plurality of users based on a viewing distance of each of the plurality of users.

The focal length calculating unit 152 reduces the focal length of the LC lens when the user's viewing distance is less than a reference value, and increases the focal length of the LC lens when the user's viewing distance is greater than the reference value. The reference value may be determined by a pre-experiment and may be set to an optimum viewing distance previously calculated depending on the size of the stereoscopic image display. A method for adjusting the focal length using the focal length calculating unit 152 is described through a focal length of the LC lens formed by the LC molecules of the LC lens cell 40 with reference to FIG. 7.

Figure 7:
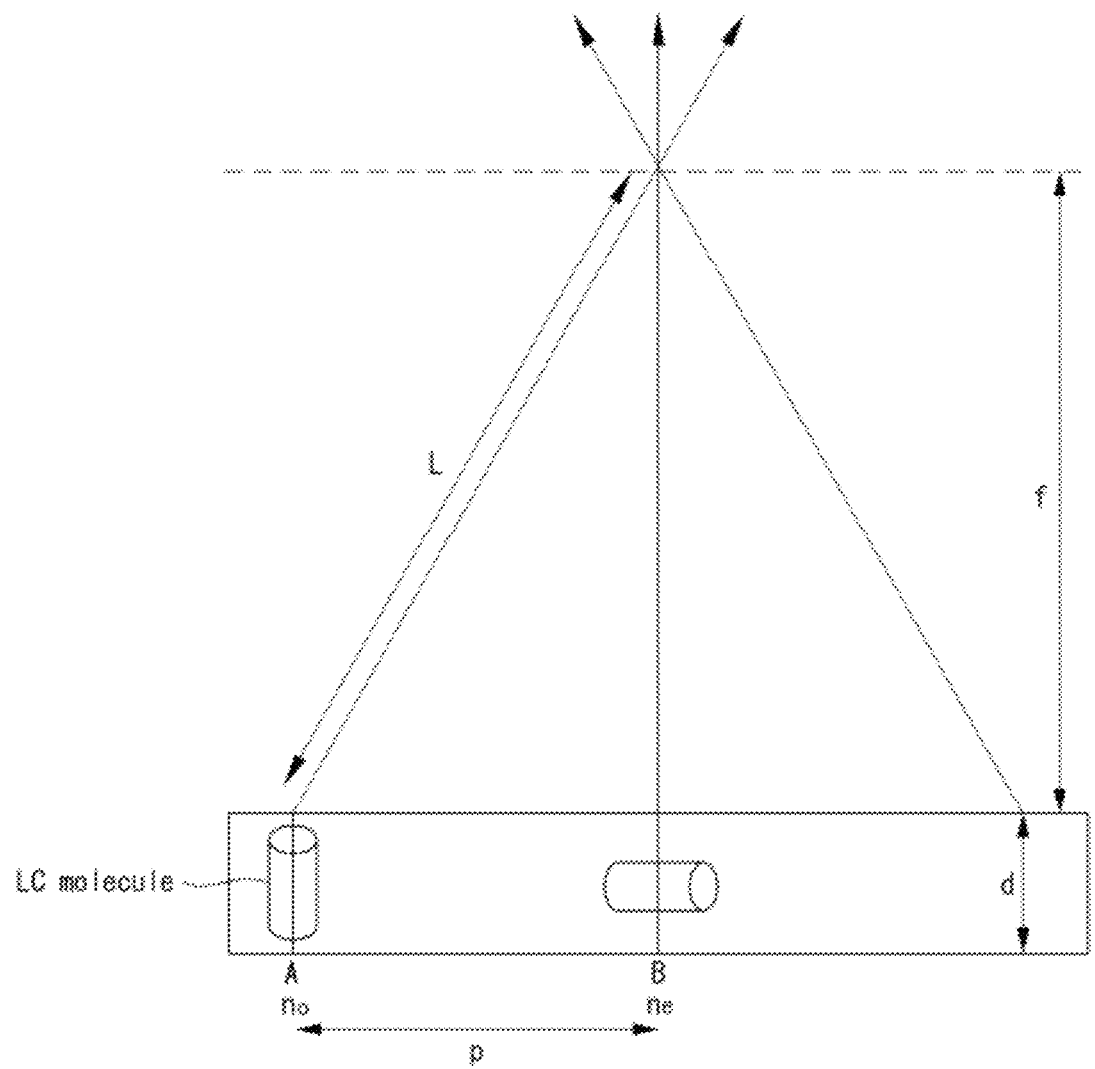
FIG. 7 illustrates a focal length of an LC lens formed by LC molecules of an LC lens cell.

FIG. 7 illustrates a focal length of an LC lens formed by LC molecules of an LC lens cell. More specifically, FIG. 7 illustrates a focal length 'f' formed depending on a difference between refractive index anisotropies of the LC molecules. In FIG. 7, 'f' denotes the focal length, 'L' a distance between a position 'A' and a focus, 'd' a thickness of the LC layer, 'p' one half of a lens pitch, '$n_0$' a refractive index anisotropy of the LC molecule at the position A, and '$n_e$' a refractive index anisotropy of the LC molecule at a position B. The position A indicates an edge portion of the LC lens, and the position B indicates a central portion of the LC lens.

The focal length 'f' may be calculated on the basis that an amount of time it takes for light starting from the position A to reach the focus is substantially equal to an amount of time it takes for light starting from the position B to reach the focus. The amount of time it takes for light starting from the position A to reach the focus is calculated by Equation 1.

$$\frac{d}{c_0} + \frac{L}{c'} = \frac{d}{c_o} + \frac{\sqrt{p^2 + f^2}}{c'}, c_0 = \frac{c}{n_0} \qquad \text{[Equation 1]}$$

In Equation 1, c is a velocity of light in the air, c' is a velocity of light in a vacuum, and $c_0$ is a value obtained by dividing the velocity 'c' of light in the air by the refractive index anisotropy $n_0$ of the liquid crystal at the position A.

The amount of time it takes for light starting from the position B to reach the focus is calculated by Equation 2.

$$\frac{d}{c_e} + \frac{f}{c'}, c_e = \frac{c}{n_e} \qquad \text{[Equation 2]}$$

In Equation 2, $c_e$ is a value obtained by dividing the velocity 'c' of light in the air by the refractive index anisotropy $n_e$ of the liquid crystal at the position B.

Because the amount of time it takes for light starting from the position A to reach the focus is substantially equal to the amount of time it takes for light starting from the position B to reach the focus, a value calculated by Equation 1 and a value calculated by Equation 2 are expressed by Equation 3.

$$\frac{d}{c_e} + \frac{f}{c'} = \frac{d}{c_0} + \frac{\sqrt{p^2 + f^2}}{c'} \qquad \text{[Equation 3]}$$

-continued $$\frac{d}{c_e} - \frac{d}{c_0} = \frac{\sqrt{p^2+f^2}}{c'} - \frac{f}{c'}$$

$$d\left(\frac{1}{c_e} - \frac{1}{c_0}\right) = \frac{1}{c'}(\sqrt{p^2+f^2} - f),$$

$$c_0 = \frac{c}{n_0}, c_e = \frac{c}{n_e}$$

$$d\left(\frac{1}{c/n_e} - \frac{1}{c/n_0}\right) = \frac{1}{c'}(\sqrt{p^2+f^2} - f)$$

$$\frac{d}{c}(n_e - n_0) = \frac{1}{c'}(\sqrt{p^2+f^2} - f), c \approx c'$$

$$d = \frac{\sqrt{p^2+f^2} - f}{(n_e - n_0)} = \frac{\sqrt{p^2+f^2} - f}{\Delta n}$$

$$f = \frac{p^2 - d(\Delta n)^2}{2d\Delta n} \approx \frac{p^2}{2d\Delta n},$$

∵ $d\Delta n$ is very small

In Equation 3, $\Delta n$ is a difference between the refractive index anisotropies of the positions A and B. Because $d\Delta n$ is a value much less than 'p' being one half of the lens pitch, the focal length 'f' may be simply expressed by p and $2d\Delta n$.

As indicated by Equation 3, the focal length 'f' may be adjusted by p and $2d\Delta n$. Because the lens pitch and the thickness 'd' of the LC layer in the LC lens cell 40 are fixed values, 'p' corresponding to one half of the lens pitch and the thickness 'd' of the LC layer may be not parameters. Thus, the focal length calculating unit 152 adjusts the difference $\Delta n$ between the refractive index anisotropies of the liquid crystal at the position A corresponding to the edge of the LC lens and the position B corresponding to the central portion of the LC lens, thereby adjusting the focal length 'f'.

Figure 8A:
FIGS. 8A to 8C illustrate an LC lens and viewpoints depending on changes in a focal length.
Figure 8A:
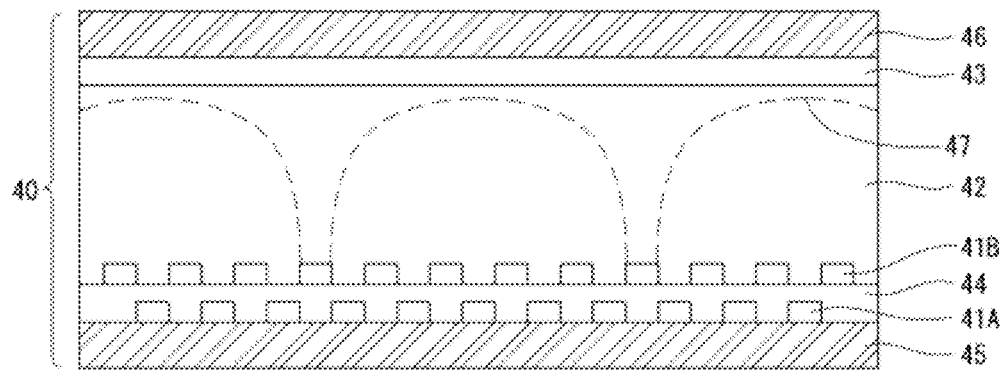
Figure 8B:
Figure 8B:
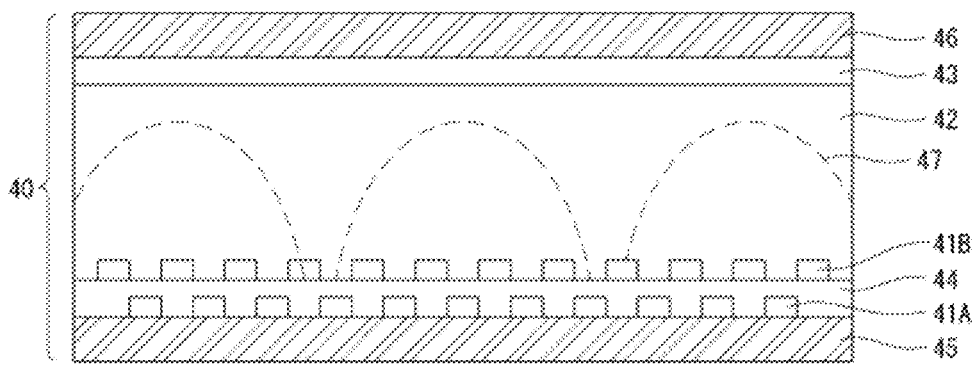
Figure 8C:
Figure 8C:
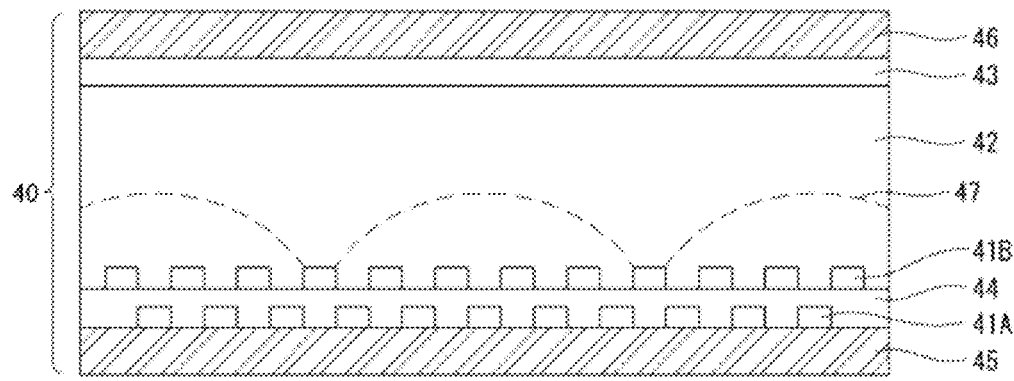

FIGS. 8A to 8C illustrate an LC lens and viewpoints depending on changes in a focal length. When the viewing distance of the user is substantially equal to the reference value, the LC lens 47 has a shape shown in FIG. 8B.

As shown in FIG. 8A, when the user's viewing distance is less than the reference value, the focal length calculating unit 152 reduces the focal length 'f' of the LC lens 47. The focal length calculating unit 152 increases the difference $\Delta n$ between the refractive index anisotropies of the liquid crystal at the position A corresponding to the edge of the LC lens 47 and the position B corresponding to the central portion of the LC lens 47, thereby reducing the focal length 'f' of the LC lens 47. In this instance, because the difference $\Delta n$ is large, the LC lens 47 is more convexly formed. Thus, as shown in FIG. 8A, the first to ninth viewpoints are positioned closer to the LC lens cell 40.

As shown in FIG. 8C, when the user's viewing distance is greater than the reference value, the focal length calculating unit 152 increases the focal length 'f' of the LC lens 47. The focal length calculating unit 152 reduces the difference $\Delta n$ between the refractive index anisotropies of the liquid crystal at the position A corresponding to the edge of the LC lens 47 and the position B corresponding to the central portion of the LC lens 47, thereby increasing the focal length 'f' of the LC lens 47. In this instance, because the difference $\Delta n$ is small, the LC lens 47 is slightly convexly formed. Thus, as shown in FIG. 8C, the first to ninth viewpoints are positioned far from to the LC lens cell 40.

The focal length calculating unit 152 may be implemented by a lookup table storing the focal lengths 'f' previously determined by a pre-experiment. The lookup table stores the focal lengths 'f' depending on the viewing distance of the user. Alternatively, the focal length calculating unit 152 may store the reference value of the user's viewing distance and may calculate the focal length 'f' depending on changes in the user's viewing distance through a numerical operation. The focal length calculating unit 152 outputs information of the calculated focal length 'f' to the electrode voltage controller 154.

The LC lens shift unit 153 receives the user position information from the user information processing unit 151. The LC lens shift unit 153 decides whether one user or the plurality of users watch the stereoscopic image based on the user position information. When one user watches the stereoscopic image, the LC lens shift unit 153 decides whether or not the one user is positioned in one of a pseudoscopic viewing region and a mixed viewing region of the view images based on the position information of the one user. When the plurality of users watch the stereoscopic image, the LC lens shift unit 153 decides whether or not each of the plurality of users is positioned in one of the pseudoscopic viewing region and the mixed viewing region of the view images based on the position information of each of the plurality of users.

The LC lens shift unit 153 determines a shift of the LC lens based on the user position information. The LC lens shift unit 153 stores position information of the first to ninth viewpoints, at which the first to ninth view images of the display panel 10 passing through the LC lens cell 40 are displayed. The LC lens shift unit 153 compares the user position information with the previously stored position information of the first to ninth viewpoints and decides whether or not the user is positioned in one of the pseudoscopic viewing region and the mixed viewing region of the view images. When the user is positioned in the pseudoscopic viewing region or the mixed viewing region of the view images, the LC lens shift unit 153 shifts the LC lens to the left or the right. Hence, the user enters in an orthoscopic viewing region. A method for shifting the LC lens using the LC lens shift unit 153 is described below with reference to FIG. 9.

Figure 9A:
FIGS. 9A and 9B illustrate a shift of an LC lens.
Figure 9A:
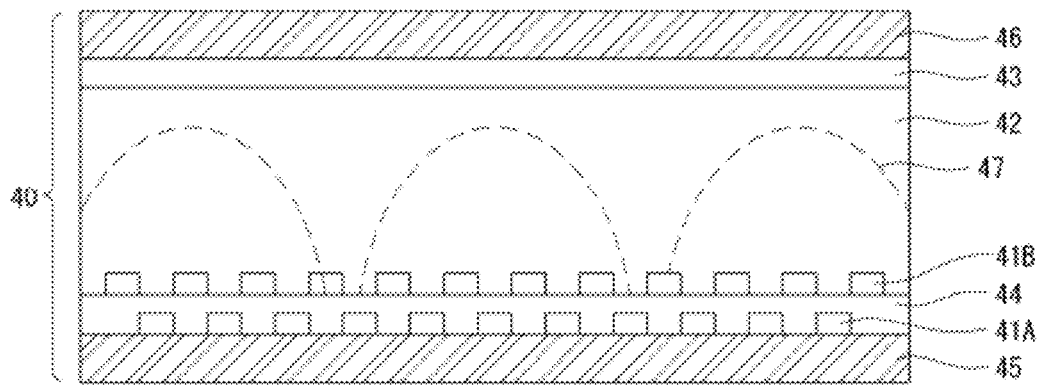
Figure 9B:
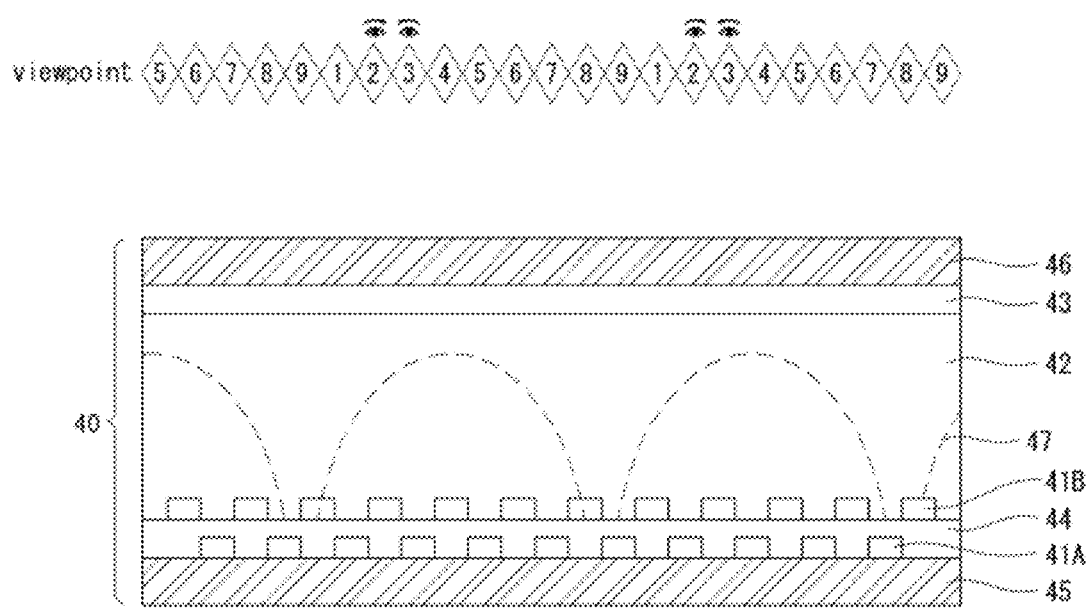

FIGS. 9A and 9B illustrate a shift of an LC lens. As shown in FIG. 9A, when the user's right eye is positioned at the ninth viewpoint and the user's left eye is positioned at the first viewpoint, the user watches the left eye image through his/her right eye and watches the right eye image through his/her left eye. Namely, the user may perceive the pseudoscopic image or a mixed image of the view images. As shown in FIG. 9B, when the LC lens 47 is shifted to the right, the user's right eye is positioned at the second viewpoint and the user's left eye is positioned at the third viewpoint. Thus, because the user is positioned in the orthoscopic region, the user may watch the optimum stereoscopic image. The LC lens shift unit 153 outputs a shift information about the shift amount of the LC lens 47 to the electrode voltage controller 154.

The electrode voltage controller 154 receives the focal length information from the focal length calculating unit 152 and receives the shift information from the LC lens shift unit 153. The electrode voltage controller 154 outputs the LC lens cell control data $C_{LENS}$ including the information about the voltage to be applied to each of the first and second electrodes 41A and 41B of the LC lens cell 40 based on the focal length information and the shift information.

As the focal length 'f' decreases, the electrode voltage controller 154 outputs the LC lens cell control data $C_{LENS}$ controlling the voltage to be applied to each of the first and second electrodes 41A and 41B so that the edge of the LC lens 47 is more convexly formed as shown in FIG. 8A. As the focal length 'f' increases, the electrode voltage controller 154 outputs the LC lens cell control data $C_{LENS}$ controlling the voltage to be applied to each of the first and second electrodes 41A and 41B so that the edge of the LC lens 47 is slightly convexly formed as shown in FIG. 8C. Further, the electrode voltage controller 154 outputs the LC lens cell control data $C_{LENS}$ shifting the voltage applied to each of the first and second electrodes 41A and 41B based on the shift information.

For example, as indicated by Table 1, the electrode voltage controller 154 may control the voltage applied to each of the common electrode 43 and the first and second electrodes 41A and 41B, so that the edge of the LC lens 47 is more convexly formed as shown in FIG. 8A.

TABLE 1

| | Common electrode | First and second electrodes | | | | | | | |
|---|---|---|---|---|---|---|---|---|---|
| | | a | b | c | d | e | f | g | h | i |
| positive | 5 V | 10 V | 9 V | 8 V | 6.5 V | 5 V | 6.5 V | 8 V | 9 V | 10 V |
| negative | 5 V | 0 V | 1 V | 2 V | 3.5 V | 5 V | 3.5 V | 2 V | 1 V | 0 V |

In Table 1, 'positive' indicates that a voltage difference between the first and second electrodes 41A and 41B and the common electrode 43 is a positive polarity. Namely, the voltage of each of the first and second electrodes 41A and 41B is greater than the common electrode 43. 'negative' indicates that a voltage difference between the first and second electrodes 41A and 41B and the common electrode 43 is a negative polarity. Namely, the voltage of each of the first and second electrodes 41A and 41B is less than the common electrode 43. This is to prevent the DC image sticking of the liquid crystals. When the liquid crystals perform the DC drive, charged particles of the LC molecules are accumulated on the alignment layers and the pre-tilt angle of the LC molecules may vary. Thus, the electrode voltage controller 154 periodically inverts a polarity of the voltage applied to each of the first and second electrodes 41A and 41B, thereby preventing the DC image sticking of the liquid crystals. As indicated by Table 1, the electrode voltage controller 154 controls the voltage supply, so that there is no voltage difference between an electrode 'e' corresponding to the central portion of the LC lens and the common electrode 43. Further, the electrode voltage controller 154 controls the voltage supply, so that a voltage difference between an electrode 'a' or 'i' corresponding to the edge of the LC lens and the common electrode 43 has a maximum value. The voltage difference between the first and second electrodes 41A and 41B and the common electrode 43 gradually increases as the first and second electrodes 41A and 41B go from the electrode 'e' to the electrode 'a' or 'i'.

As the focal length 'f' increases, the electrode voltage controller 154 slightly convexly forms the LC lens 47 as shown in FIG. 8C. Thus, the electrode voltage controller 154 outputs the LC lens cell control data $C_{LENS}$, which decreases the voltage difference between the common electrode 43 and each of the first and second electrodes 41A and 41B corresponding to the edge of the LC lens. Hence, the movement of the LC molecules at the edge of the LC lens decreases.

For example, as indicated by Table 2, the electrode voltage controller 154 may control the voltage applied to each of the common electrode 43 and the first and second electrodes 41A and 41B, so that the edge of the LC lens 47 is slightly convexly formed as shown in FIG. 8C.

In Table 2, 'positive' indicates that a voltage difference between the first and second electrodes 41A and 41B and the common electrode 43 is a positive polarity. Namely, the voltage of each of the first and second electrodes 41A and 41B is greater than the common electrode 43. 'negative' indicates that a voltage difference between the first and second electrodes 41A and 41B and the common electrode 43 is a negative polarity. Namely, the voltage of each of the first and second electrodes 41A and 41B is less than the common electrode 43. This is to prevent the DC image sticking of the liquid crystals. When the liquid crystals perform the DC drive, charged particles of the LC molecules are accumulated on the alignment layers and the pre-tilt angle of the LC molecules may vary. Thus, the electrode voltage controller 154 periodically inverts a polarity of the voltage applied to each of the first and second electrodes 41A and 41B, thereby preventing the DC image sticking of the liquid crystals. As indicated by Table 2, the electrode voltage controller 154 controls the voltage supply, so that there is no voltage difference between the electrode 'e' corresponding to the central portion of the LC lens and the common electrode 43. Further, the electrode voltage controller 154 controls the voltage supply, so that a voltage difference between an electrode 'a' or 'i' corresponding to the edge of the LC lens and the common electrode 43 has a maximum value. The voltage difference between the first and second electrodes 41A and 41B and the common electrode 43 gradually increases as the first and second electrodes 41A and 41B go from the electrode 'e' to the electrode 'a' or 'i'.

As can be seen from a comparison between Tables 1 and 2, the electrode voltage controller 154 may increase the voltage difference between the common electrode 43 and each of the first and second electrodes 41A and 41B, so that the movement of the LC molecules at the edge of the LC lens increases. Hence, the edge of the LC lens 47 is more convexly formed as shown in FIG. 8A. Further, the electrode voltage controller 154 may decrease the voltage difference between the common electrode 43 and each of the first and second electrodes 41A and 41B, so that the movement of the LC molecules at the edge of the LC lens decreases. Hence, the edge of the LC lens 47 is slightly convexly formed as shown in FIG. 8C.

The electrode voltage controller 154 may be implemented by a lookup table for storing the voltage to be applied to each of the first and second electrodes 41A and 41B. The voltages stored in the lookup table are previously determined by a pre-experiment. In this instance, the lookup table stores the voltage to be applied to each of the first and second electrodes

TABLE 2

| | Common electrode | First and second electrodes | | | | | | | |
|---|---|---|---|---|---|---|---|---|---|
| | | a | b | c | d | e | f | g | h | i |
| positive | 5 V | 8 V | 7 V | 6 V | 5.5 V | 5 V | 5.5 V | 6 V | 7 V | 8 V |
| negative | 5 V | 2 V | 3 V | 4 V | 4.5 V | 5 V | 4.5 V | 4 V | 3 V | 2 V |

41A and 41B based on the focal length T. Alternatively, the electrode voltage controller 154 may store a reference value of the focal length 'f' and may calculate the voltage to be applied to each of the first and second electrodes 41A and 41B depending on changes in the focal length 'f' through a numerical operation. The electrode voltage controller 154 outputs the LC lens cell control data $C_{LENS}$ including the information about the finally calculated voltage to be applied to each of the first and second electrodes 41A and 41B of the LC lens cell 40 to the LC lens cell driver 140. The LC lens cell driver 140 outputs the voltage to be applied to each of the common electrode 43 and the first and second electrodes 41A and 41B of the LC lens cell 40 based on the LC lens cell control data $C_{LENS}$.

Figure 10:
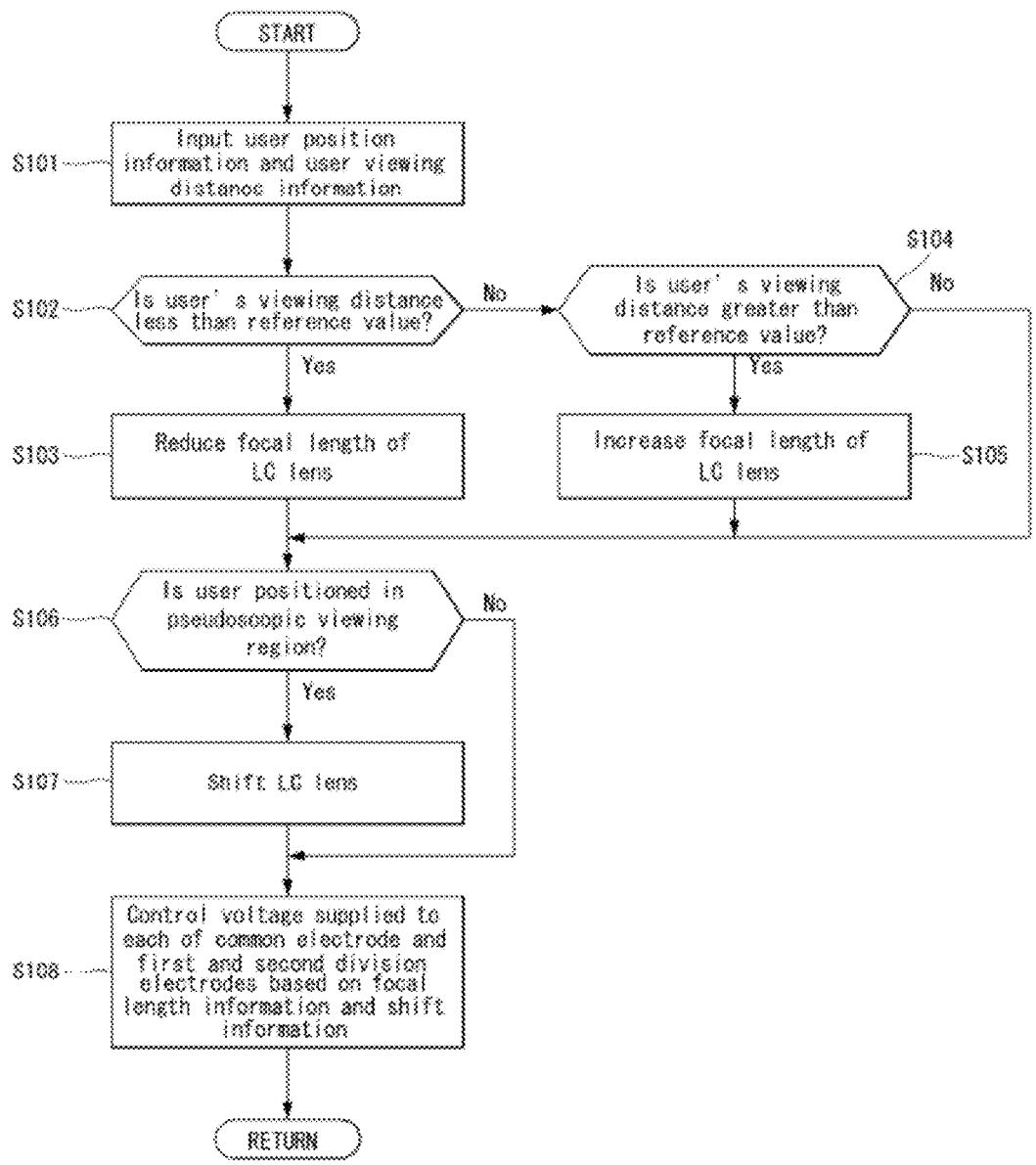
FIG. 10 is a flow chart illustrating a method for driving an LC lens cell according to an exemplary embodiment of the invention.

FIG. 10 is a flow chart illustrating a method for driving the LC lens cell according to the embodiment of the invention. The method for driving the LC lens cell according to the embodiment of the invention is described below in relation to the LC lens cell controller 150 shown in FIG. 4.

As shown in FIG. 10, the user information processing unit 151 inputs the user position information and the user viewing distance information to the focal length calculating unit 152 in step S101. The user sensor 170 senses the user information including the user position information and the user viewing distance information. The user information may be extracted from the user information processing unit 151. The operation performed in step S101 was described in detail above in relation to the user information processing unit 151 shown in FIG. 4.

Next, the focal length calculating unit 152 decides whether or not the user's viewing distance is less than the reference value in step S102. When the user's viewing distance is less than the reference value, the focal length calculating unit 152 reduces the focal length of the LC lens in step S103. When the user's viewing distance is greater than the reference value, the focal length calculating unit 152 increases the focal length of the LC lens in steps S104 and S105. When the user's viewing distance is substantially equal to the reference value, the focal length calculating unit 152 outputs the focal length without the adjustment. The operation performed in steps S102 to S105 was described in detail above in relation to the focal length calculating unit 152 shown in FIG. 4.

Next, the LC lens shift unit 153 decides whether or not the user is positioned in one of the pseudoscopic viewing region and the mixed viewing region of the view images in step S106. When the user is positioned in the pseudoscopic viewing region or the mixed viewing region of the view images, the LC lens shift unit 153 shifts the LC lens in step S107. Hence, the user is positioned in the orthoscopic viewing region. However, when the user is positioned in the orthoscopic viewing region, the LC lens shift unit 153 does not shift the LC lens. The operation performed in steps S106 and S107 was described in detail above in relation to the LC lens shift unit 153 shown in FIG. 4.

Next, the electrode voltage controller 154 controls the voltage supplied to each of the common electrode 43 and the first and second electrodes 41A and 41B of the LC lens cell 40 based on the focal length information and the shift information calculated through steps S102 to S107 in step S108.

As described above, the stereoscopic image display according to the embodiment of the invention automatically senses whether or not the user is positioned in one of the pseudoscopic viewing region and the mixed viewing region of the view images. When the user watches the stereoscopic image in the pseudoscopic viewing region or the mixed viewing region of the view images, the stereoscopic image display according to the embodiment of the invention adjusts the focal length of the LC lens or shifts the LC lens. As a result, the stereoscopic image display according to the embodiment of the invention can provide the stereoscopic image with the optimum quality because the user can watch the stereoscopic image in the orthoscopic viewing region.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
   a display panel configured to display first to nth view images produced by separating cameras from one another by a general distance between both eyes and photographing images of an object, where n is a natural number;
   a liquid crystal (LC) lens cell configured to move LC molecules existing in an LC layer between a lower substrate and an upper substrate of the display panel based on a voltage difference between a common electrode and each of electrodes, form an LC lens, and refract the first to nth view images into first to nth viewpoints;
   an LC lens cell controller configured to control a voltage supplied to each of the common electrode and the electrodes; and
   an LC lens cell driver configured to supply the voltage to each of the common electrode and the electrodes under the control of the LC lens cell controller,
   wherein the LC lens cell controller receives a user viewing distance information and a user position information, calculates a focal length of the LC lens using the user viewing distance information and the user position information, calculates a shift information of the LC lens using the user position information, and control the voltage supplied to each of the electrodes based on an information of the calculated focal length and the calculated shift information.

2. The stereoscopic image display of claim 1, wherein the LC lens cell controller includes:
   a focal length calculating unit configured to reduce the focal length of the LC lens when a user's viewing distance is less than a reference value based on the user viewing distance information and increase the focal length of the LC lens when the user's viewing distance is greater than the reference value far from the stereoscopic image display based on the user viewing distance information;
   an LC lens shift unit configured to compare the user position information with a previously stored position information of the first to nth viewpoints and calculate a shift amount of the LC lens to the extent that a user is positioned in an orthoscopic viewing region when the user is positioned in a pseudoscopic viewing region or a mixed viewing region of the first to nth view images; and
   a electrode voltage controller configured to control the voltage supplied to each of the common electrode and the electrodes based on the focal length information calculated by the focal length calculating unit and the shift information of the LC lens calculated by the LC lens shift unit.

3. The stereoscopic image display of claim 2, wherein as the focal length of the LC lens decreases, the electrode voltage controller increases the voltage difference between the common electrode and each of the electrodes at an edge of the LC lens so that the edge of the LC lens is more convexly formed, wherein as the focal length of the LC lens increases, the electrode voltage controller decreases the voltage difference between the common electrode and each of the electrodes at the edge of the LC lens so that the edge of the LC lens is slightly convexly formed.

4. The stereoscopic image display of claim 2, wherein the electrode voltage controller controls the voltage of each of the common electrode and the electrodes so that the LC lens is shifted based on the shift information of the LC lens.

5. The stereoscopic image display of claim 2, further comprising a user sensor configured to sense the user's viewing distance using an infrared sensor and store images of the user using the cameras for extracting the user position information.

6. The stereoscopic image display of claim 5, wherein the LC lens cell controller further includes a user information processing unit configured to receive the images of the user and the user viewing distance information, map a previously determined facial mask to the images of the user to extract the user position information, and output the user viewing distance information and the user position information.

7. The stereoscopic image display of claim 5, wherein when one user watches a stereoscopic image, the focal length calculating unit calculates a focal length of the LC lens based on a viewing distance of the one user, wherein when a plurality of users watch the stereoscopic image, the focal length calculating unit calculates a focal length of the LC lens corresponding to a position of each of the plurality of users based on a viewing distance of each of the plurality of users.

8. The stereoscopic image display of claim 5, wherein when one user watches a stereoscopic image, the LC lens shift unit decides whether or not the one user is positioned in one of the pseudoscopic viewing region and the mixed viewing region of the first to nth view images based on a position information of the one user, wherein when a plurality of users watch the stereoscopic image, the LC lens shift unit decides whether or not each of the plurality of users is positioned in one of the pseudoscopic viewing region and the mixed viewing region of the first to nth view images based on a position information of each of the plurality of users.

9. A method for driving a stereoscopic image display comprising:

preparing a display panel, which display first to nth view images produced by separating cameras from one another by a general distance between both eyes and photographing images of an object, where n is a natural number, and a liquid crystal (LC) lens cell, which moves LC molecules existing in an LC layer between a lower substrate and an upper substrate of the display panel based on a voltage difference between a common electrode and each of electrodes and forms an LC lens;

controlling a voltage supplied to each of the common electrode and the electrodes;

supplying the voltage to each of the common electrode and the electrodes; and refracting the first to nth view images into first to nth viewpoints, wherein the controlling of the voltage supplied to each of the common electrode and the electrodes includes:

receiving a user viewing distance information and a user position information;

calculating a focal length of the LC lens using the user viewing distance information and the user position information;

calculating a shift information of the LC lens using the user position information; and controlling the voltage supplied to each of the electrodes based on an information of the calculated focal length and the calculated shift information.

10. The method of claim 9, wherein the controlling of the voltage supplied to each of the common electrode and the electrodes includes:

reducing the focal length of the LC lens when a user's viewing distance is less than a reference value based on the user viewing distance information and increasing the focal length of the LC lens when the user's viewing distance is greater than the reference value based on the user viewing distance information;

comparing the user position information with a previously stored position information of the first to nth viewpoints and calculating a shift amount of the LC lens to the extent that a user is positioned in an orthoscopic viewing region when the user is positioned in a pseudoscopic viewing region or a mixed viewing region of the first to nth view images; and controlling the voltage supplied to each of the common electrode and the electrodes based on the focal length information and the shift information of the LC lens.

11. The method of claim 10, wherein the controlling of the voltage supplied to each of the common electrode and the electrodes includes:

increasing the voltage difference between the common electrode and each of the electrodes at an edge of the LC lens so that the edge of the LC lens is more convexly formed as the focal length of the LC lens decreases; and decreasing the voltage difference between the common electrode and each of the electrodes at the edge of the LC lens so that the edge of the LC lens is slightly convexly formed as the focal length of the LC lens increases.

12. The method of claim 10, wherein the controlling of the voltage supplied to each of the common electrode and the electrodes includes controlling the voltage of each of the common electrode and the electrodes so that the LC lens is shifted based on the shift information of the LC lens.

13. The method of claim 9, further comprising sensing a user's viewing distance using an infrared sensor and storing images of the user using the cameras for extracting the user position information.

14. The method of claim 13, wherein the controlling of the voltage supplied to each of the common electrode and the electrodes includes receiving the images of the user and the user viewing distance information, mapping a previously determined facial mask to the images of the user to extract the user position information, and outputting the user viewing distance information and the user position information.

15. The method of claim 10, wherein the reducing of the focal length when the user's viewing distance is less than a reference value based on the user viewing distance information and the increasing of the focal length when the user's viewing distance is greater than the reference value based on the user viewing distance information include:

calculating a focal length of the LC lens based on a viewing distance of one user when the one user watches a stereoscopic image; and calculating a focal length of the LC lens corresponding to a position of each of a plurality of users based on a viewing distance of each of the plurality of users when the plurality of users watch the stereoscopic image.

16. The method of claim 10, wherein the controlling of the voltage supplied to each of the common electrode and the electrodes includes:

deciding whether or not one user is positioned in one of the pseudoscopic viewing region and the mixed viewing region of the first to nth view images based on a position information of the one user when the one user watches a stereoscopic image; and deciding whether or not each of a plurality of users is positioned in one of the pseudoscopic viewing region and the mixed viewing region of the first to nth view images based on a position information of each of the plurality of users when the plurality of users watch the stereoscopic image.

* * * * *